United States Patent [19]

Smith et al.

[11] Patent Number: 5,293,493
[45] Date of Patent: Mar. 8, 1994

[54] PREEMPTION CONTROL FOR CENTRAL PROCESSOR WITH CACHE

[75] Inventors: Bruce A. Smith, Jupiter; Loc T. Tran, Boca Raton, both of Fla.

[73] Assignee: International Business Machines Corporation, Armonk, N.Y.

[21] Appl. No.: 428,259

[22] Filed: Oct. 27, 1989

[51] Int. Cl.$^5$ .............................................. G06F 13/00
[52] U.S. Cl. ....................... 395/325; 364/229; 364/230.1; 364/230.4; 364/240; 364/240.4; 364/243.4; 364/242.6; 364/242.92; 364/243.41; 364/251.3; 364/260; 364/270
[58] Field of Search ... 364/200 MS File, 900 MS File, 364/DIG. 1, DIG. 2; 371/62, 20.6; 395/325, 725, 425

[56] References Cited

U.S. PATENT DOCUMENTS

| | | | |
|---|---|---|---|
| 4,323,965 | 4/1982 | Johnson et al. | 395/425 |
| 4,502,117 | 2/1985 | Kihara | 395/425 |
| 4,570,220 | 2/1986 | Tetrick et al. | 395/325 |
| 4,611,275 | 9/1986 | Garniet | 395/325 |
| 4,689,786 | 8/1987 | Sidhu et al. | 370/94.1 |
| 4,757,441 | 7/1988 | Buckland et al. | 395/153 |
| 4,760,515 | 7/1988 | Malmquist et al. | 395/325 |
| 4,833,596 | 5/1980 | Buckland et al. | 395/275 |
| 4,947,368 | 8/1990 | Donaldson et al. | 395/325 |
| 4,969,120 | 11/1990 | Azevedo et al. | 395/325 |
| 4,980,854 | 12/1990 | Donaldson et al. | 395/325 |
| 4,982,404 | 1/1991 | Hartman | 371/62 |
| 5,032,984 | 7/1991 | Byers et al. | 395/425 |
| 5,047,921 | 9/1991 | Kinter et al. | 395/650 |
| 5,051,946 | 9/1991 | Cubranich et al. | 395/325 |
| 5,119,292 | 6/1992 | Baker et al. | 395/725 |

OTHER PUBLICATIONS

IBM Technical Disclosure Bulletin, vol. 32, No. 10A, dated Mar. of 1990, pp. 50–54.

Primary Examiner—Allen R. MacDonald
Assistant Examiner—Ayaz R. Sheikh
Attorney, Agent, or Firm—George E. Grosser

[57] ABSTRACT

A logic controlled gate is inserted in the arbitration logic of a computer system that supports multiple masters on a data bus. In such a system with arbitration for data bus ownership, the gate is so controlled that competitors for the data bus cannot force the main processor (CPU) from the data bus until certain system conditions are met. In particular, a pattern of CPU "hits" to memory cache is recognized as an opportunity for the CPU to relinquish the data bus.

4 Claims, 6 Drawing Sheets

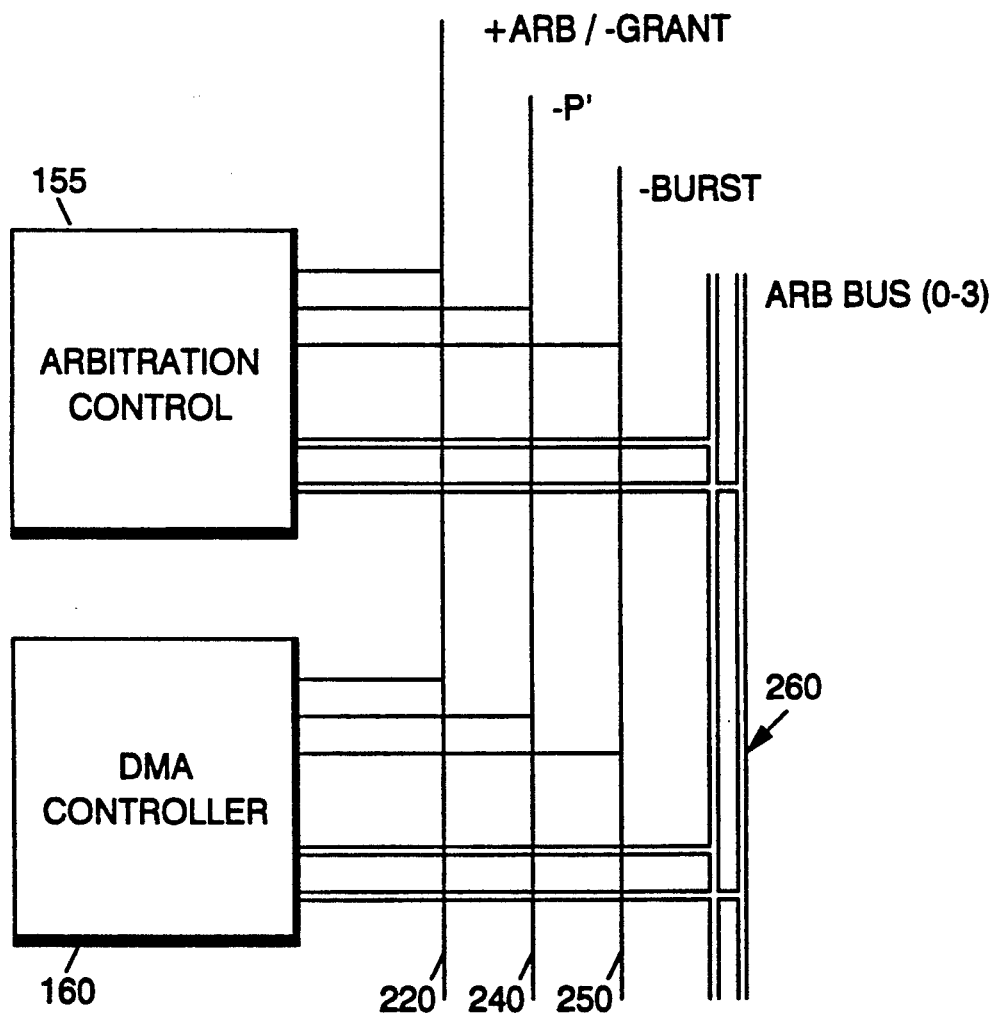

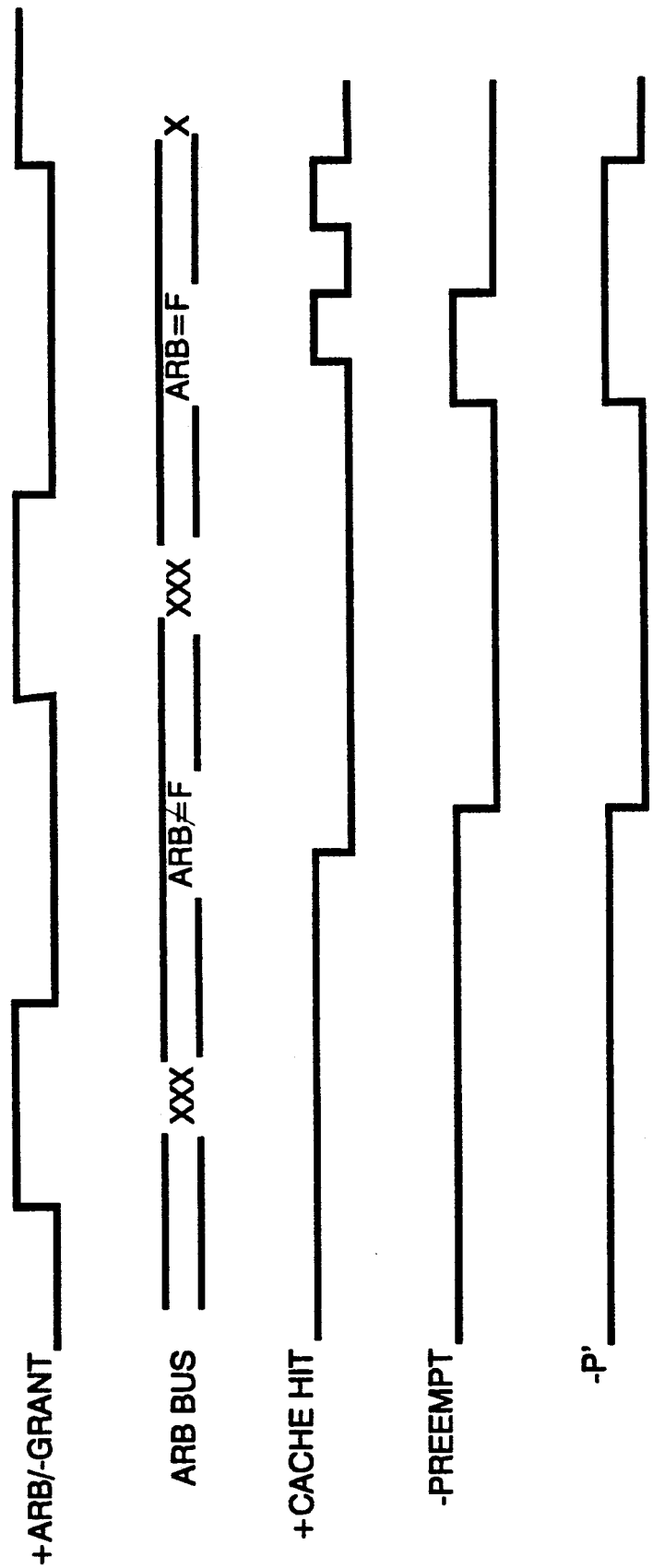

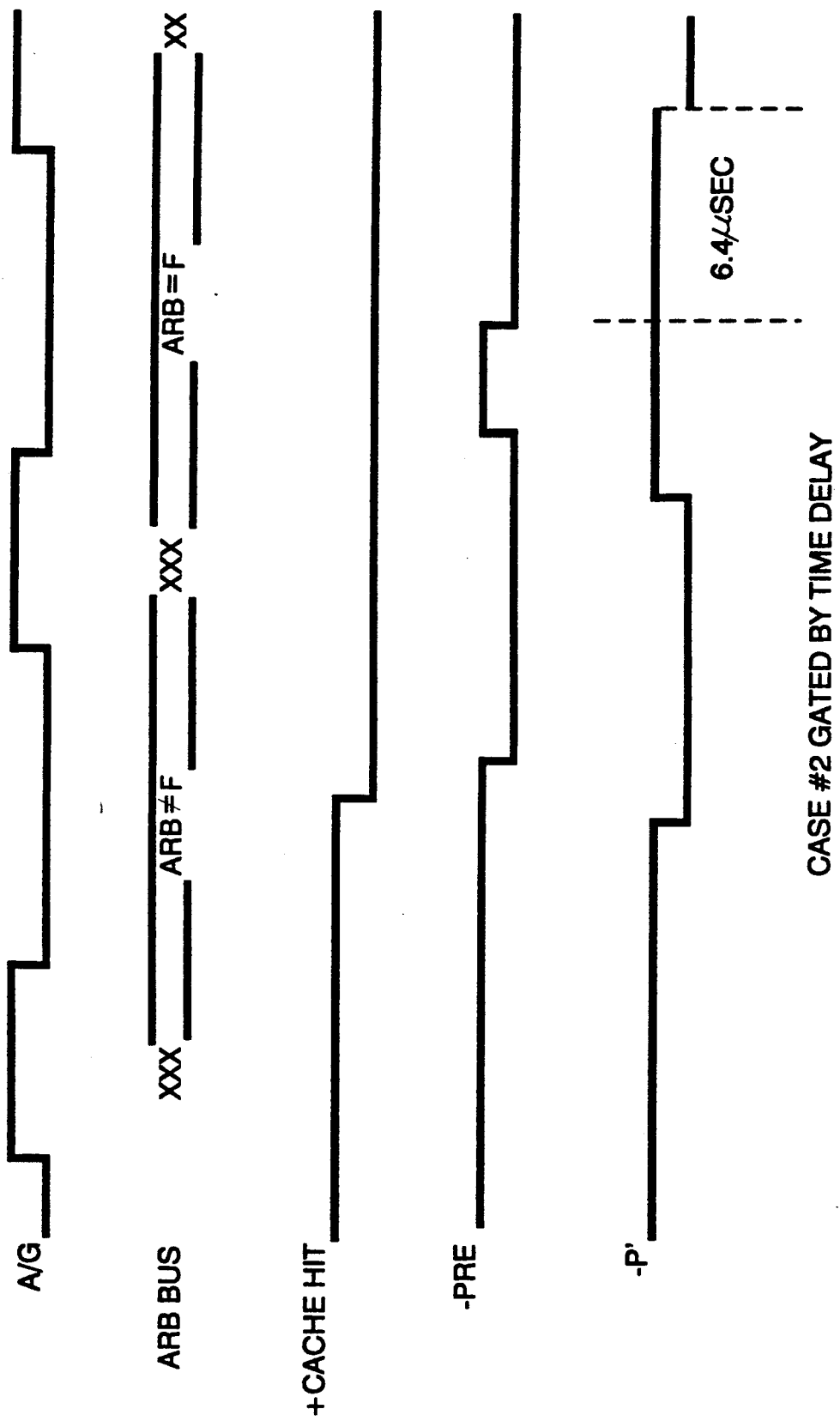

PREEMPTION CONTROL FOR CENTRAL PROCESSOR WITH CACHE

BACKGROUND OF THE INVENTION

1. Technical Field

The present invention relates to computer systems in general and in particular to computer systems which include a data bus which may be controlled by plural masters including a main processor and which allocate bus time according to a predefined arbitration scheme.

2. Description of the Prior Art

It is known in computer systems, such as those conforming to IBM Corporation's Micro Channel architecture, to have multiple masters which each can manage data transfers over the system's main data bus. The use of such masters serves to relieve the main processing unit (CPU) from detailed involvement in data transfers between input/output (I/O) devices and main memory and also from I/O device to I/O device. By offloading these duties the CPU is permitted to more fully concentrate its efforts on processing data and setting up transfers that other devices will execute.

In such systems, priorities are established for the respective devices on the data bus to allocate bus time. The CPU is assigned the default or residual priority recognizing that the main work on the bus is desirably allocated to other devices. If a queue develops the devices including the CPU vie for the bus each arbitration cycle and the highest in priority wins. As burst devices may continually assert their high priority, a "fairness" limitation is often used with the burst devices to force them to wait until the existing queue disappears before they may reenter the queue.

This process works well to efficiently allocate bus time unless the duty on the data bus becomes high. In that case, the CPU gets its chance on the bus infrequently, as the priority scheme permits, and then gets "bumped off" after one bus cycle if another device preempts. This situation can "lock out" the CPU to an extent that it can't perform the preparatory setup needed for data transfers or other activity such as memory access that it requires to perform tasks. When this condition is reached the overall system performance deteriorates and, in an extreme case, there may be a system crash. Overcoming the problem of lock out becomes more complicated in systems with memory cache because the main processor may enter a string of cache hits that avoid the need to capture the data bus to accomplish the needed transfer of information.

SUMMARY OF THE INVENTION

Accordingly, it is a primary object of the invention to assure that the CPU of such a system is assured a preselected amount of time on for data transfer even during high duty cycle periods for data transfer over the main data bus.

It is a further object of the invention to provide such time without restructuring the arbitration process of the system. Another object of the invention is to take into account cache transfers of the main processor when allocating bus time to the main processor.

The present invention prevents the CPU from being forced off the data bus by creating a controlled preference when the CPU owns the data bus. Such preference is preferably introduced by logic which modifies the bus request signals arriving at the central arbitration controller. By so controlling the bus request line, when the CPU owns the data bus, that request signals may pass to the central arbitration control only after a pattern of successful accesses to memory cache has occurred, the CPU is allowed an opportunity to perform necessary data bus transfers while recognizing the action of the memory cache as an alternative to accessing main memory over the data bus. By additionally timing out this cancellation of bus requests within a preselected period after the first such request arrives a presently preferred implementation of the invention is able to assure that the refresh requirements of dynamic main memory may be met.

BRIEF DESCRIPTION OF THE DRAWINGS

A full understanding of the present invention will be obtained from the detailed description of the presently preferred embodiment presented below, and the accompanying drawings, which are provided for purposes of illustration and are not intended to limit in any way the scope of the invention, wherein:

FIG. 4 is a diagrammatic representation, in block form, illustrating the application of the modified bus request signal to the central arbitration control and the DMA controller according to the presently preferred implementation for the invention;

FIG. 5 includes FIGS. 5A and 5B which are a timing diagram illustrating an arbitration sequence According to a presently preferred implementation for the invention.

DETAILED DESCRIPTION OF PRESENTLY PREFERRED IMPLEMENTATION

Figure 1:
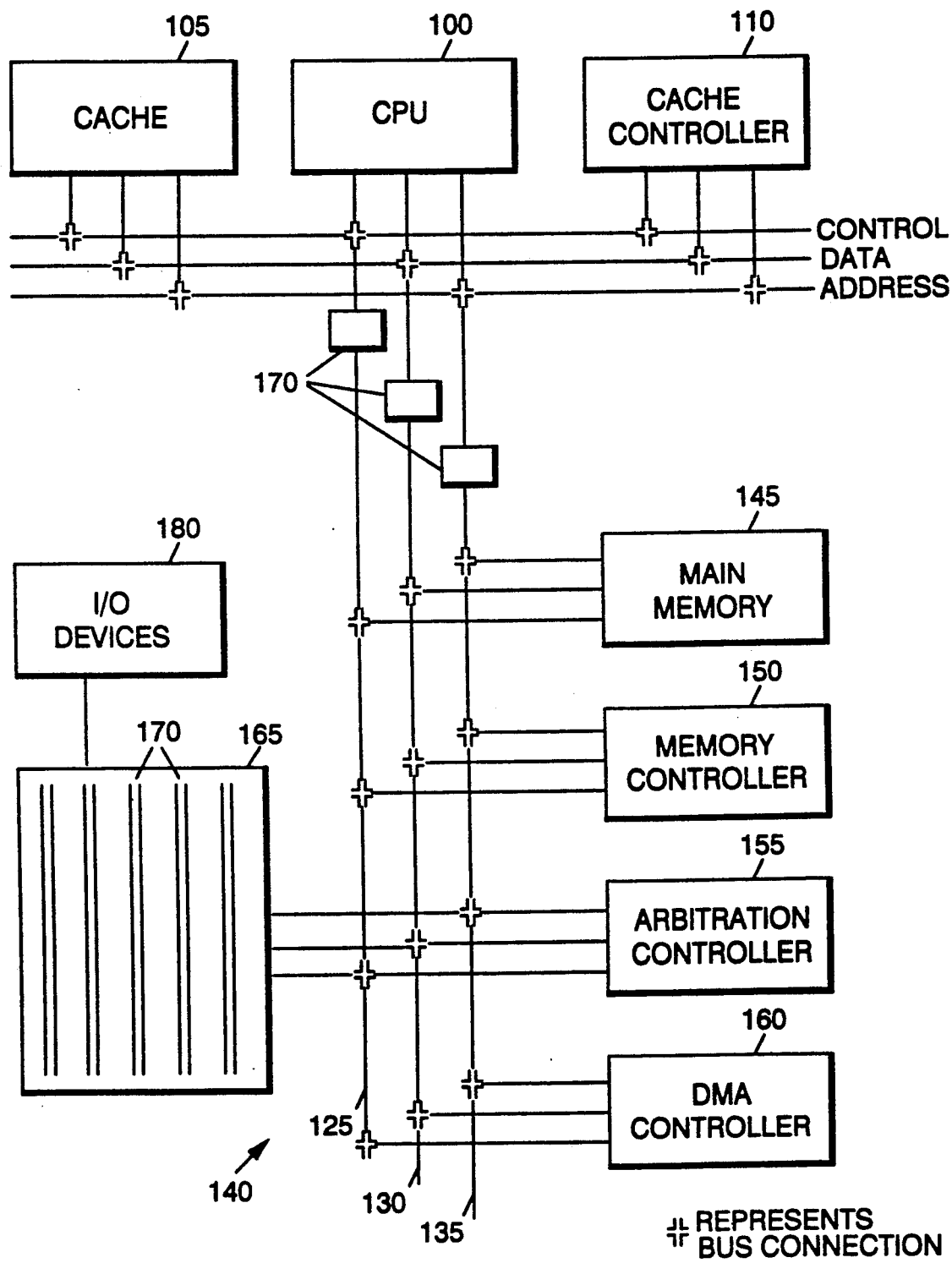
FIG. 1 is a diagrammatic representation, in block form of a presently preferred system for implementing the invention.

A presently preferred implementation for the invention will now be described in detail with reference to the drawings. Referring to FIG. 1 a preferred system for implementing the invention includes a CPU 100, such as an Intel Corporation 80386 microprocessor, a cache 105, and a cache controller 110 which are connected to other system elements over a set 140 of CPU signal buses including a control bus 125, a data bus 130 and an address bus 135. The CPU signal buses 140 are isolated from a corresponding set of system buses 140' by a set of buffers 170. The buffers 170 allow the CPU to process instructions and data over the busses 140 independently of the system bus set 140' when the instructions and data reside in the cache 105. Connected to the bus set 140 are a main memory 145, which is directly addressable read/write dynamic storage and a memory controller 150 along with an arbitration controller and a DMA controller which serves to control direct memory transfers over the bus set 140.

For systems according to the invention there is preferably provided a connection point 165 permitting bus interface devices 170 such as bus master devices which can control a data bus to be connected to the system bus set 140'. These connections are usually made by inserting circuit boards into slots fitted with card edge connectors (indicated in edge view only in FIG. 1) as is well known in the art. The interface devices 170 may connect to a variety of other devices such as input/output (I/O) devices 180. Such devices 180 may include, for example disc drives or tape units (not shown). Such a system arrangement including interface devices 170, which may be bus masters, and control the data bus 115 is specified for IBM Corporation's Micro Channel architecture described in detail in the "IBM Personal System/2 Hardware Interface Technical Manual". With such a system, a central arbitration controller 155 establishes the priority of devices taking control of the data bus 130' and a DMA controller 160 coordinates the actual transfers over such bus as is well known. A typical set of arbitration priority level assignments is illustrated at Table 1.

TABLE 1

| ARBITRATION LEVEL | PRIMARY ASSIGNMENT |
|---|---|
| −2 | MEMORY REFRESH |
| −1 | ERROR RECOVERY |
| 0 | DMA Port 0 |
| 1 | DMA Port 1 |
| 2 | DMA Port 2 |
| 3 | DMA Port 3 |
| 4 | DMA Port 4 |
| 5 | DMA Port 5 |
| 6 | DMA Port 6 |
| 7 | DMA Port 7 |
| 8 | SPARE |
| 9 | SPARE |
| A | SPARE |
| B | SPARE |
| C | SPARE |
| D | SPARE |
| E | SPARE |
| F | SYSTEM BOARD PROCESSOR (CPU) |

Figure 2:
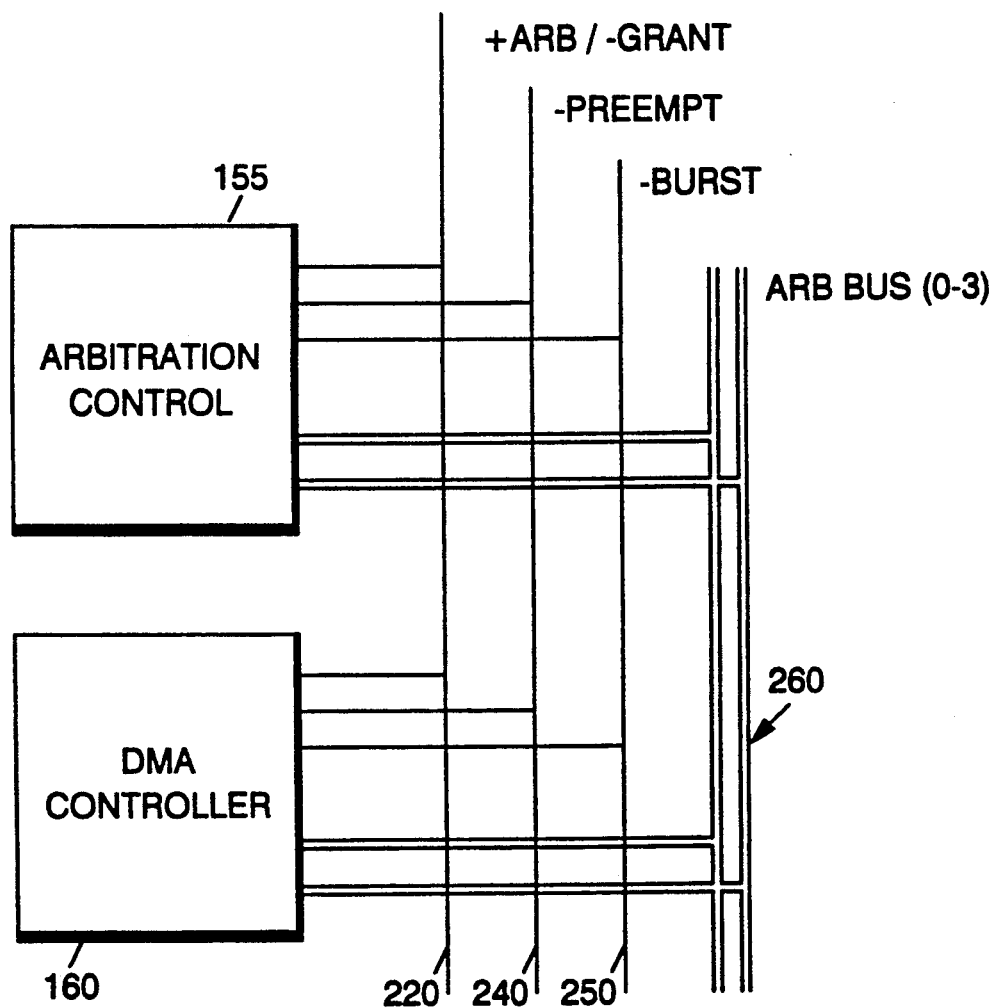
FIG. 2 is a diagrammatic representation, in block form, illustrating the control signals applied to the central arbitration control and the DMA controller according to the prior art.

Now, referring to FIG. 2, the prior art includes a group of lines 210 forming a part of the control bus 125' (see FIG. 1) which carry signals controlling the ownership of the data bus 130'.

A channel 220 carries a +ARB/−GRANT signal that serves to separate periods when arbitration to establish bus ownership is occurring (ARB) and periods when ownership is fixed (GRANT) and the various masters 170 can function respective of that ownership assignment. A channel 240 serves to carry a signal −PREEMPT which indicates when one or more master devices, such as device 170 and including the CPU 100 are waiting to access the data bus 130'. A channel 250 carries the −BURST signal which is asserted by a device 170 when it owns the data bus 130' to indicate whether it is a device capable of multiple or burst transfers.

Also connected to the central arbitration control 155 is an arbitration bus 260 consisting of preferably four lines (0-3) on which arbitration levels are asserted to achieve ownership of the data bus 130' and then, during the time GRANT is asserted on channel 220, to identify the owner.

Figure 3:
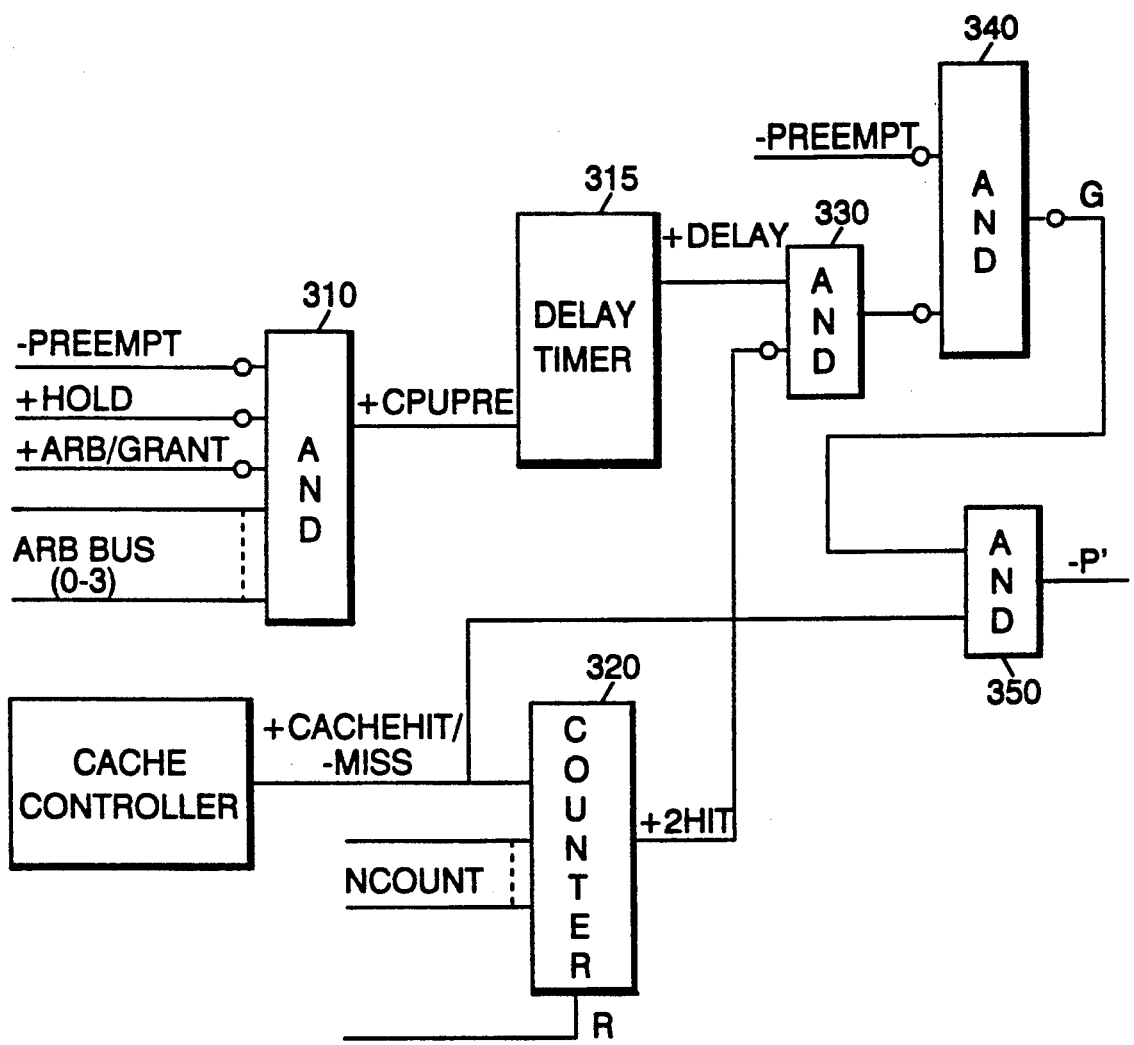
FIG. 3 is a diagrammatic representation, in block form, of presently preferred logic for producing a modified bus request signal according to the invention.

Now referring to FIG. 3, an AND gate 310 creates a signal +CPUPRE based on the −PREEMPT, +HOLD, the +ARB/GRANT and the ARB BUS signals(1111=F corresponds to the CPU 100) to indicate the CPU owns the data bus 130'. This signal +CPUPRE triggers a delay timer 315 set to create a signal for a predefined time selected to be within the refresh requirements of the main memory 145 so as not to violate system rules and cause a loss of data. A counter 320 counts cache hits indicated by cache controller 110 and after a predetermined count, preferably two, sets a signal +2HIT. Two hits is selected because it is sufficient to indicate a string of hits is likely and the CPU can then give up the bus 130'. The signal +DELAY and the inverse of +2HIT are ANDed at gate 330 to produce a signal BLK the inverse of which is applied at an AND gate 340 along with the inverse of −PREEMPT to produce a signal G. The signal G is applied at an AND gate 350 along with the inverse of the +CACHEHIT/−MISS signal to produce the signal −P'. The signal −P' is a modification of the −PREEMPT signal to block requests that occur when the CPU 100 owns the bus 130' until either two consecutive cache hits occur or the delay period expires after the first request arriving during such ownership.

Referring now to FIG. 4, the configuration of FIG. 2 has been modified according to the preferred implementation so that the line 240 carries the signal −P' which is the version of the request signal −PREEMPT modified as described above. The effect of this modification of the request signal −PREEMPT is seen in the two timing diagrams of FIG. 5, the first illustrating a two cache hit situation and the second illustrate a delay timeout situation.

The invention has been described in detail with reference to a presently preferred embodiment thereof but it will be appreciated that various alternatives within will be suggested to those skilled in the art and in determining the scope for the invention reference should be made to the claims considering any equivalents to which applicant is entitled.

What is claimed is:

1. In a computer system having a data bus and plural masters, including a main processor, connected thereto which contend for said data bus using bus request signals transmitted over a signal path connecting said masters to arbitration control logic which identifies, by a device identifying signal on an arbitration bus of said computer system, a current bus owner, said system having a memory cache system connected to said data bus to cooperate with said main processor to provide data from a cache buffer which includes first means to provide a first logic signal for each instance when such data is provided, a preference circuit for the main processor comprising:

second means connected to receive said device identifying signal for detecting intervals in which said main processor is identified as owner of the data bus and for generating a second logic signal during such interval;

third means connected to said first means for receiving and counting said first logic signals and producing a third logic signal when a predefined count is reached; a gate connected to receive said second and third logic signals and included in said signal path ahead of said arbitration control logic to intercept said bus request signals, which gate blocks bus request signals when said second logic signal is active while said third logic signal is not active and otherwise passes said bus request signal to said arbitration control logic.

2. A preference circuit according to claim 1 wherein a logic device detects a bus request signal occurring while said second logic signal is active and triggers a fourth logic signal after a predefined delay, which fourth logic is applied to said gate to cancel the blocking of said bus request signals.

3. A preference circuit according to claims 1 or 2 wherein said predefined count is two.

4. A preference circuit according to claim 2 wherein said computer system includes main memory which requires periodic refresh and the predefined delay is selected to be shorter than the refresh period of said main memory.

* * * * *